United States Patent
Mayer

(10) Patent No.: US 7,194,401 B2
(45) Date of Patent: Mar. 20, 2007

(54) CONFIGURATION FOR IN-CIRCUIT EMULATION OF A PROGRAM-CONTROLLED UNIT

(75) Inventor: Albrecht Mayer, Delsenhofen (DE)

(73) Assignee: Infineon Technologies AG, Munich (DE)

( * ) Notice: Subject to any disclaimer, the term of this patent is extended or adjusted under 35 U.S.C. 154(b) by 695 days.

(21) Appl. No.: 10/444,544

(22) Filed: May 23, 2003

(65) Prior Publication Data

US 2003/0220782 A1    Nov. 27, 2003

(30) Foreign Application Priority Data

May 23, 2002    (EP)    ................... 02011311

(51) Int. Cl.
*G06F 9/455*    (2006.01)
(52) U.S. Cl. .................... 703/28; 714/33; 714/38; 714/42
(58) Field of Classification Search ............ 703/28, 703/24; 714/28, 33, 38, 39, 42, 45
See application file for complete search history.

(56) References Cited

U.S. PATENT DOCUMENTS

| | | | | |
|---|---|---|---|---|
| 5,357,626 A * | 10/1994 | Johnson et al. | ............... | 714/33 |
| 5,796,987 A | 8/1998 | Habermayr et al. | | |
| 5,848,264 A * | 12/1998 | Baird et al. | ................ | 703/28 |
| 5,960,190 A * | 9/1999 | MacKenna | ................... | 703/28 |
| 5,983,367 A * | 11/1999 | Higuchi et al. | ............... | 714/42 |
| 6,314,530 B1 * | 11/2001 | Mann | .......................... | 714/38 |
| 6,377,911 B1 * | 4/2002 | Sample et al. | ............... | 703/24 |
| 6,420,781 B1 | 7/2002 | Wendorff et al. | | |
| 6,598,176 B1 * | 7/2003 | Tago | .......................... | 714/28 |
| 6,668,242 B1 * | 12/2003 | Reynov et al. | ............... | 703/28 |
| 6,834,365 B2 * | 12/2004 | Bardsley et al. | ............. | 714/45 |
| 6,957,180 B1 * | 10/2005 | Nemecek | ...................... | 703/28 |
| 2001/0051866 A1 * | 12/2001 | Ishii | .......................... | 703/28 |
| 2003/0018929 A1 * | 1/2003 | Bardsley et al. | ............. | 714/39 |
| 2003/0033559 A1 * | 2/2003 | Williams | ...................... | 714/39 |

FOREIGN PATENT DOCUMENTS

| | | |
|---|---|---|
| EP | 0 633 529 A1 | 1/1995 |
| EP | 0 905 779 A2 | 3/1999 |

OTHER PUBLICATIONS oo et al., "Fast hardware-software coverification by optimistic execution of real processor", ACM 2000.*

* cited by examiner

*Primary Examiner*—Paul Rodriguez
*Assistant Examiner*—Kandasamy Thangavelu
(74) *Attorney, Agent, or Firm*—Laurence A. Greenberg; Werner H. Stemer; Ralph E. Locher

(57) ABSTRACT

A configuration contains a test unit that, during emulation, replaces a program-controlled unit that is used in normal operation of the system containing the program-controlled unit. The test unit has a first program-controlled unit and a second program-controlled unit. The first program-controlled unit contains only some of the components of the program-controlled unit replaced by the test unit, and the second program-controlled unit contains those components of the program-controlled unit replaced by the test unit that are not contained in the first program-controlled unit. In addition, the first program-controlled unit contains a control device which monitors whether one of the components of the first program-controlled unit requests access to a component not present in the first program-controlled unit and which, if this is so, prompts appropriate access to the corresponding component in the second program-controlled unit.

11 Claims, 3 Drawing Sheets

CONFIGURATION FOR IN-CIRCUIT EMULATION OF A PROGRAM-CONTROLLED UNIT

BACKGROUND OF THE INVENTION

Field of the Invention

The present invention relates to a configuration for in-circuit emulation of a program-controlled unit.

The program-controlled unit is a microprocessor, a microcontroller or a signal processor, for example.

In-circuit emulation of a program-controlled unit allows the states existing and operations taking place in the program-controlled unit to be tracked and altered during operation of the system that contains the program-controlled unit.

In particular, it is possible, by way of example but certainly not exclusively, for the contents of internal registers or memories in the program-controlled unit to be read and output or altered, for data or signals transmitted within the program-controlled unit to be output from the program-controlled unit (trace data), for the commands which need to be executed and/or operands which are used by the program-controlled unit to be fetched from a different memory than is normally the case, and/or for execution of the program executed by the program-controlled unit to be interrupted.

These and other actions can be made dependent on the materialization of particular conditions, by way of example, but, as is known, not exclusively, on the arrival at a particular value of a program counter.

Emulation allows errors occurring in the system that contains the program-controlled unit to be localized and corrected during operation of the system and allows the response of the system to be tested when executing new or modified programs.

The system containing the program-controlled unit is subsequently called the target system.

The program-controlled unit used in normal operation of the target system cannot usually be operated such that the states existing and operations taking place in it can be tracked and altered, because it does not contain the components required for this, on account of space and cost.

In-circuit emulation can generally be performed only using a special version of the program-controlled unit.

The special version of the program-controlled unit is subsequently called the program-controlled unit emulation version. The version of the program-controlled unit that is used in normal operation of the target system is subsequently called the program-controlled unit standard version.

The program-controlled unit emulation version is generally part of a "test unit" which, during emulation, replaces the program-controlled unit standard version used during normal operation of the target system.

From the point of view of the target system, the test unit behaves like the program-controlled unit standard version used in normal operation of the target system. Hence, the target system behavior during emulation is as in normal operation, to be more precise as if the program executed by the program-controlled unit emulation version provided on the test unit were being executed by the program-controlled unit standard version used in normal operation of the target system.

However, the test unit is not only an equivalent substitute for the program-controlled unit standard version used in normal operation of the target system. It is configured such that the actions required for emulation can be performed when prompted by an external control device.

The basic configuration of such a test unit is shown in FIG. 4.

In the configuration shown in FIG. 4, the target system is formed by a printed circuit board SLP. The printed circuit board SLP holds a pin base S into which the program-controlled unit standard version is plugged in normal operation of the target system. In addition, the printed circuit board SLP can hold further semiconductor chips C1, C2 and C3 and/or further or different system components.

During emulation, the aforementioned test unit is inserted into the pin base S instead of the program-controlled unit standard version. Under certain circumstances, the program-controlled unit replaced by the test unit can be left in the target system during emulation. This is so if, during emulation, the program-controlled unit can be put into a state in which it is inactive and its input and/or output connections have a high impedance. In this case, the program-controlled unit replaced by the test unit may also have been soldered onto the printed circuit board SLP.

In the example under consideration, the test unit contains a printed circuit board PLP holding:
a) the program-controlled unit emulation version already mentioned above and denoted by the reference PPG in FIG. 4;
b) components denoted by the reference DEB and subsequently called debug resources; and
c) an electrical connector PC for connecting the test unit to an external control device.

The debug resources DEB are components that are required for performing emulation, and they contain, by way of example:
a) an overlay memory which, when prompted by the external control device, uses the program-controlled unit PPG as the program or operand memory instead of the program or operand memory which is normally used;
b) a trace memory which buffer-stores (trace) data, which are continually read from the program-controlled unit PPG and represent internal states and/or operations, such as data and/or signals transmitted via internal buses or the contents of internal registers; and
c) breakpoint logic which monitors whether a condition prescribed by the external control device is satisfied and, if this is so, then performs or prompts actions prescribed by the external control device.

The external control device, which has already been mentioned more than once, is denoted by the reference CTRL and is formed by a personal computer, for example.

The program-controlled unit emulation version PPG provided on the test unit is generally a "bond-out" version of the program-controlled unit. A bond-out version of a program-controlled unit differs from the standard version of the program-controlled unit in question in that it has additional input and/or output connections which are connected to points within the program-controlled unit which are not accessible in the program-controlled unit standard version, the connections being able to be used to make data and control-command transfers, required for emulation, between the program-controlled unit PPG and the external control device CTRL and between the program-controlled unit PPG and the debug resources DEB.

The use of a bond-out version of a program-controlled unit is very advantageous on the one hand, but on the other also entails various problems. In particular, a program-controlled unit bond-out version is relatively expensive because it is difficult to configure and manufacture the bond-out version such that it behaves exactly like the standard version, and because the bond-out version is required only in relatively small numbers of units.

These problems can be avoided or at least lessened if the program-controlled unit standard version is already in a form such that in-circuit emulation is possible. As a result, however, the program-controlled unit standard version becomes larger and more expensive than a standard version of the program-controlled unit that does not have these special features.

SUMMARY OF THE INVENTION

It is accordingly an object of the invention to provide a configuration for in-circuit emulation of a program-controlled unit that overcomes the above-mentioned disadvantages of the prior art devices of this general type, which minimizes the complexity needed to emulate a program-controlled unit.

With the foregoing and other objects in view there is provided, in accordance with the invention, a configuration for in-circuit emulation of a program-controlled unit having components. The configuration contains a test unit for replacing, during emulation, the program-controlled unit used in normal operation of a system containing the program-controlled unit. The test unit has a first program-controlled unit and a second program-controlled unit connected to the first program-controlled unit. The first program-controlled unit contains first components emulating only some of the components of the program-controlled unit replaced by the test unit, and the second program-controlled unit contains second components emulating others of the components of the program-controlled unit replaced by the test unit not emulated by the first program-controlled unit. During emulation, the first program-controlled unit executes a program normally executed by the program-controlled unit during normal operation of the system. The first program-controlled unit contains a control device for monitoring whether one of the first components of the first program-controlled unit requests access to a component not contained in the first program-controlled unit and, if the access is requested, the first program-controlled unit prompts appropriate access to an appropriate one of the second components in the second program-controlled unit.

The inventive configuration allows the states existing and operations taking place in a program-controlled unit to be tracked and altered with minimal complexity. In particular, there is no need for the program-controlled unit used in normal operation of the target system to have available an emulation version that corresponds to it exactly. It is also possible to use a program-controlled unit emulation version that is only partially equivalent to the program-controlled unit used in normal operation of the target system.

In accordance with an added feature of the invention, the control device ascertains whether the access to the component not contained in the first program-controlled unit is requested by evaluating trace data generated in the first program-controlled unit.

In accordance with another feature of the invention, the control device ascertains whether the access to the component not contained in the first program-controlled unit is requested by evaluating data transmitted via a line or a bus used to transmit the data or signals requesting access operations which are to be ascertained.

In accordance with an additional feature of the invention, the second program-controlled unit has a core, and the control device of the first program-controlled unit prompts access operations to the second components in the second program-controlled unit by transmitting to the second program-controlled unit commands to be executed by the core of the second program-controlled unit.

In accordance with a further feature of the invention, the second program-controlled unit injects the commands supplied to the second program-controlled unit by the first program-controlled unit into the core and executes them there. The second program-controlled unit contains a control device for forwarding to the first program-controlled unit data output by the second components of the second program-controlled unit which are not present in the first program-controlled unit. The second program-controlled unit contains a control device for forwarding to the first program-controlled unit interrupt requests output by the second components of the second program-controlled unit not present in the first program-controlled unit.

In accordance with another added feature of the invention, the system has connections for connecting the program-controlled unit replaced by the test unit to the system containing the program-controlled unit. The connections have a first portion connected to the first program-controlled unit and a second portion connected to the second program-controlled unit during emulation.

In accordance with another further feature of the invention, the second program-controlled unit used is the program-controlled unit replaced by the test unit during emulation.

In accordance with a further additional feature of the invention, a bus connects the first program-controlled unit to the second program-controlled unit. The first program-controlled unit has connections connecting the first program-controlled unit to the bus and output data only during emulation.

In accordance with a concomitant feature of the invention, the first program-controlled unit contains a memory for storing trace data, and the memory has a storage capacity of at least 64 kbits.

Other features which are considered as characteristic for the invention are set forth in the appended claims.

Although the invention is illustrated and described herein as embodied in a configuration for in-circuit emulation of a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 4:
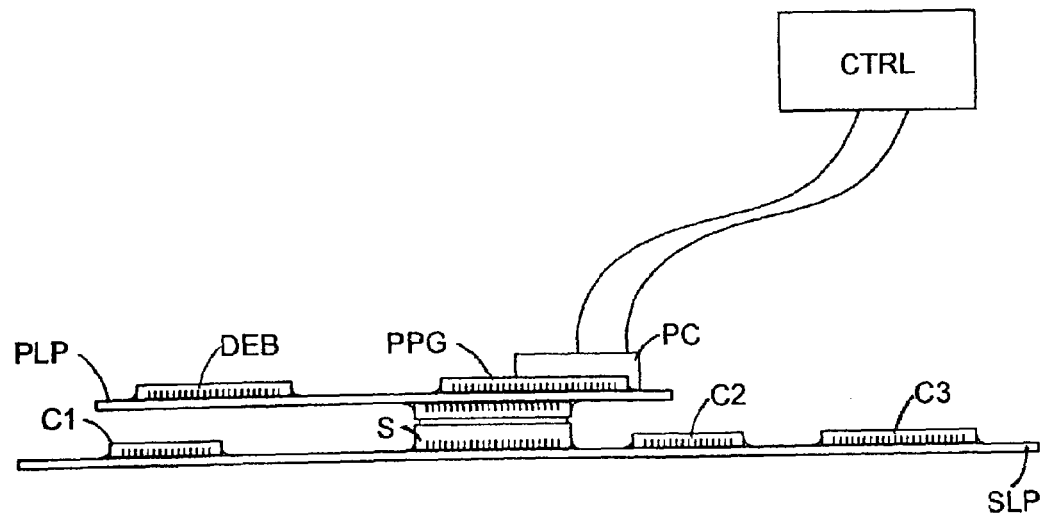
FIG. 4 is a side-elevational view of a conventional configuration for in-circuit emulation of a program-controlled unit.

Referring now to the figures of the drawing in detail and first, particularly, to FIG. 1 thereof, there is shown a subsequently described configuration for emulating a program-controlled unit that has the same basic configuration as the conventional configuration described at the outset with reference to FIG. 4. That is to say it likewise contains a test unit, which is used during emulation instead of the program-controlled unit used in normal operation of the target system, and an external control apparatus CTRL for controlling the components provided on the test unit.

The test unit for the configuration described below has a different configuration than the test unit for conventional configurations for emulating program-controlled units, however.

Figure 1:
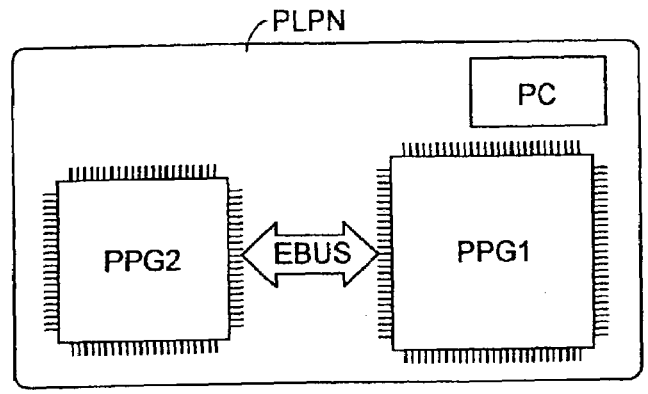
FIG. 1 is a diagrammatic, plan view of a configuration of a test unit in the subsequently described configuration for in-circuit emulation of a program-controlled unit.

The configuration of the test unit for the configuration described below is shown in FIG. 1.

The test unit contains a printed circuit board PLPN holding a first program-controlled unit PPG1 and a second program-controlled unit PPG2, connected to the latter by a bus EBUS, subsequently called the emulation bus, and also holding an electrical connector PC.

The first program-controlled unit PPG1 contains a core and various other components, such as one or more memory devices, a DMA controller, an analog/digital converter, a digital/analog converter, etc.

The components of the first program-controlled unit PPG1 have, at least to some extent, the same function and the same behavior as the components of the program-controlled unit replaced by the test unit during emulation. This applies at least to the cores of the program-controlled units. As regards the function and the behavior of the rest of the components of the program-controlled units, there does not have to be any concurrence. That is to say the first program-controlled unit PPG1 can have more or fewer or different or differently operating peripheral units than the program-controlled unit replaced by the test unit during emulation. Preferably, however, the first program-controlled unit PPG1 and the program-controlled unit replaced by the test unit during emulation have, besides the core, as many components as possible whose function and behavior concur.

In addition, the first program-controlled unit PPG1 also contains the debug resources that need to be provided in order to be able to track and alter the internal states and operations in the first program-controlled unit PPG1. The debug resources and the rest of the first program-controlled unit PPG1 can be accommodated on a common semiconductor chip or on different semiconductor chips.

The second program-controlled unit PPG2 likewise contains a core and various other components, these other components of the second program-controlled unit PPG2 being, at least to some extent, different components, or components with a different behavior, than the components of the first program-controlled unit PPG1, however.

The other components of the second program-controlled unit PPG2 have, at least to some extent, the same function and the same behavior as the components of the program-controlled unit replaced by the test unit during emulation. To be more precise, the second program-controlled unit PPG2 contains all the components which are contained in the program-controlled unit replaced by the test unit and which are not present in the first program-controlled unit PPG1.

However, the second program-controlled unit PPG2 can have more or fewer or different components than the program-controlled unit replaced by the test unit.

Hence, every component of the program-controlled unit replaced by the test unit has a corresponding component with an identical function and identical behavior in the first program-controlled unit PPG1 and/or in the second program-controlled unit PPG2.

The components of the program-controlled unit replaced by the test unit and the components of the program-controlled units PPG1 and PPG2 which have the same function and the same behavior do not need to be entirely identical. In particular, it is generally admissible for the relevant components of the program-controlled units PPG1 and PPG2 to be more powerful than the corresponding components of the program-controlled unit replaced by the test unit. By way of example, it is possible for a memory provided in the program-controlled units PPG1 or PPG2 to have a greater storage capacity than the corresponding memory in the program-controlled unit replaced by the test unit.

On account of the fact that every component of the program-controlled unit replaced by the test unit has a corresponding component with an identical function and identical behavior in the first program-controlled unit PPG1 and/or in the second program-controlled unit PPG2, the program-controlled units PPG1 and PPG2 can cooperate such that, from the point of view of the target system, they have the same behavior as the program-controlled unit replaced by the test unit.

As already mentioned more than once, during emulation the test unit replaces the program-controlled unit used in the target system during normal operation thereof.

In this context, the test unit is connected to the connections that are used to connect the program-controlled unit replaced by the test unit to the target system in normal operation thereof. In the example under consideration, it will be assumed that the connection is made via the pin base S. In this case, the test unit is plugged into the pin base S.

However, the test unit can also be connected to the target system in any other manner.

When the test unit has been connected to the pin base S, some of the contact elements in the pin base S are connected to input and/or output connections of the first program-controlled unit PPG1 and some of the contact elements in the pin base S are connected to input and/or output connections of the second program-controlled unit PPG2.

To be more precise:

a) those contact elements in the pin base S which, in normal operation of the target system, are connected to components of the program-controlled unit replaced by the test unit which are replaced by corresponding components of the first program-controlled unit PPG1 during emulation are connected to the input and/or output connections of the first program-controlled unit PPG1 which are associated with these components; and b) those contact elements in the pin base S which, in normal operation of the target system, are connected to components of the program-controlled unit replaced by the test unit which are replaced by corresponding components of the second program-controlled unit PPG2 during emulation are connected to the input and/or output connections of the second program-controlled unit PPG2 which are associated with these components.

During emulation, the first program-controlled unit PPG1 executes the program that, in normal operation of the system, is executed by the program-controlled unit replaced by the test unit (when using emulation to localize and eliminate errors which occur) or is intended to be executed at a later time (when using emulation to test new software and/or new operands).

The second program-controlled unit PPG2 does not execute a program, or executes a program that cannot obstruct cooperation between the program-controlled units PPG1 and PPG2. In particular, the program executed in the second program-controlled unit PPG2 should not obstruct access operations to the components that replace corresponding components of the program-controlled unit replaced by the test unit and are not present in the first program-controlled unit PPG1. Such a program can be, by way of example, a program containing exclusively NOP commands.

The first program-controlled unit PPG1 contains a control device that monitors whether one of the components of the first program-controlled unit PPG1 requests access to a component that is not present in the first program-controlled unit. If the control device establishes that this is so, it prompts access via the bus EBUS to the corresponding component of the second program-controlled unit PPG2.

Hence, from the point of view of the target system, the program-controlled units PPG1 and PPG2 behave like the program-controlled unit replaced by the test unit, specifically even when neither the first program-controlled unit PPG1 nor the second program-controlled unit PPG2 in the test unit concur with the program-controlled unit replaced by the test unit.

The second program-controlled unit PPG2 used can be the program-controlled unit replaced by the test unit. Therefore, it is always possible to ensure that the program-controlled units PPG1 and PPG2 contain all the components of the program-controlled unit replaced by the test unit.

No particular demands are made of the second program-controlled unit PPG2. In particular, it is not necessary for this to be a program-controlled unit that allows emulation.

Only the first program-controlled unit PPG1 needs to be a program-controlled unit that allows emulation.

The first program-controlled unit PPG1 has input and/or output connections that can be used to connect it (using the electrical connector PC) to the external control device CTRL. This connection can be used to transfer data and control signals between the first program-controlled unit PPG1 and the external control device CTRL. In this case, the external control device CTRL can prompt the first program-controlled unit PPG1 to output data representing internal states and operations and/or to alter internal states and operations. In addition, the external control device CTRL can prescribe the conditions under which the first program-controlled unit PPG1 needs to execute the actions prescribed by the external control device CTRL. Both actuation of the first program-controlled unit PPG1 and execution of the actions to be executed subsequently by the first program-controlled unit can take place during execution of the program that needs to be executed by the first program-controlled unit.

The emulation bus EBUS, which connects the first program-controlled unit PPG1 and the second program-controlled unit PPG2 to one another, is a bus used exclusively during emulation. That is to say that the connections of the first program-controlled unit PPG1 that are used to connect the emulation bus EBUS to the first program-controlled unit output data exclusively during emulation.

Figure 2:
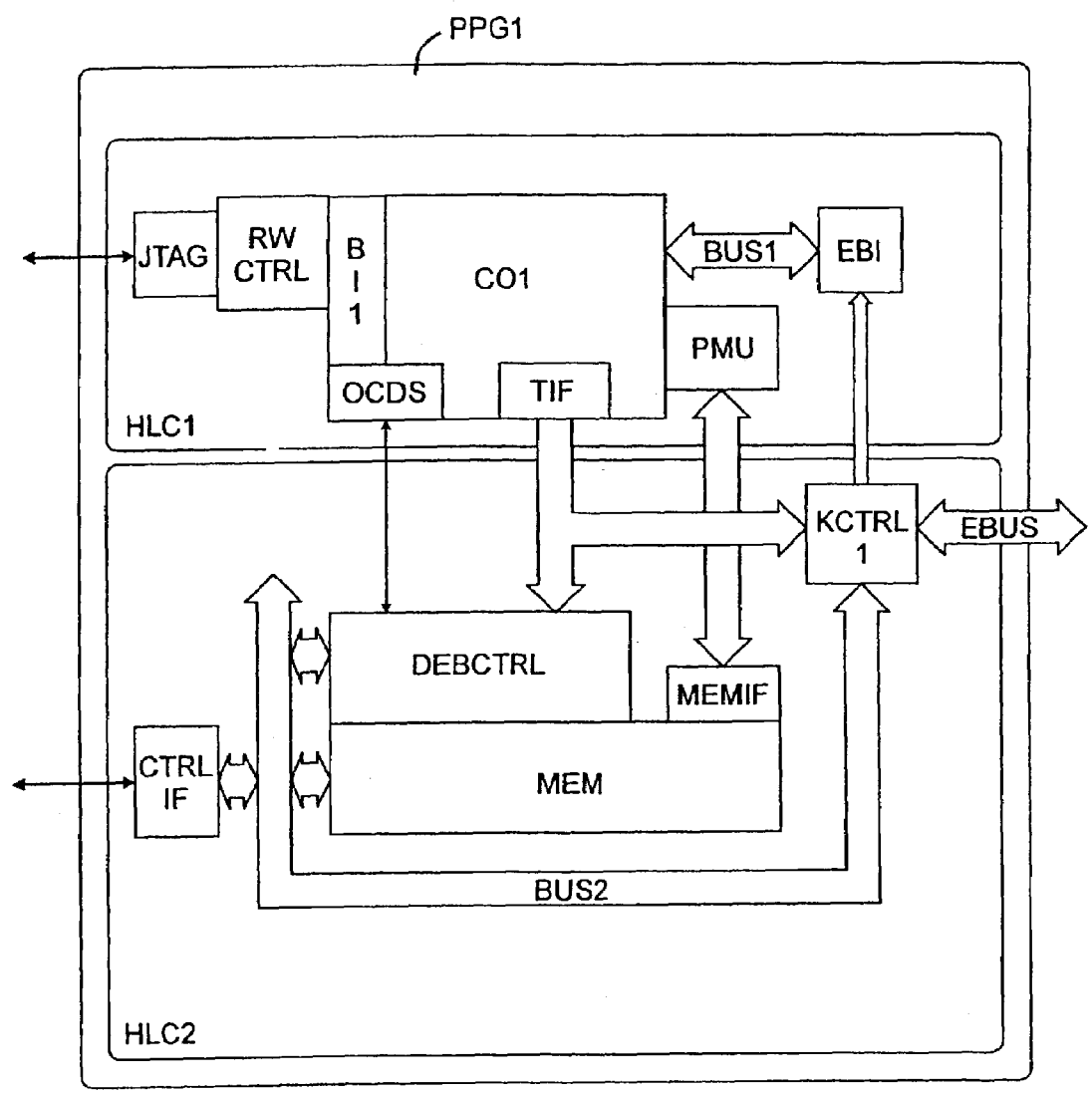
FIG. 2 is a block circuit diagram of a first program-controlled unit for the test unit shown in FIG. 1.

FIG. 2 schematically shows the configuration of an exemplary embodiment of the first program-controlled unit PPG1. For the sake of completeness, it should be pointed out that FIG. 2 shows only the components of the first program-controlled unit that are of particular interest in the present case, i.e. only the components which are significant to the emulation and the cooperation of the program-controlled units PPG1 and PPG2.

The first program-controlled unit contains two semiconductor chips HLC1 and HLC2 that are connected to one another.

The first semiconductor chip HLC1 contains a core CO1, a command injection unit BI1 integrated in the core CO1, an on-chip debug support module or OCDS module OCDS integrated in the core CO1, a trace interface TIF integrated in the core CO1, a program management unit PMU connected to the core CO1, a non-illustrated program store connected to the program management unit PMU, an internal bus BUS1 connected to the core CO1, peripheral units connected to the internal bus BUS1, such as a DMA controller, an analog/digital converter, a non-illustrated digital/analog converter etc., an emulation bus interface EBI connected to the bus BUS1, a JTAG interface JTAG connected to the external control device CTRL by the plug connector PC, and a read/write control device RWCTRL disposed between the JTAG interface JTAG and the command injection unit BI.

The second semiconductor chip HLC2 contains a debug control device DEBCTRL connected to the OCDS module OCDS and the trace interface, an internal bus BUS2 connected to the debug control device DEBCTRL, a memory MEM connected to the debug control device DEBCTRL, to the program management unit PMU and to the bus BUS2, an interface MEMIF provided between the program management unit PMU and the memory MEM, a cooperation control unit KCTRL1 connected to the trace interface TIF, to the internal bus BUS2, to the emulation bus interface EBI and to the emulation bus EBUS, and an interface CTRLIF, connected to the bus BUS2, for transferring data between the external control device and the second semiconductor chip HLC2.

Figure 3:
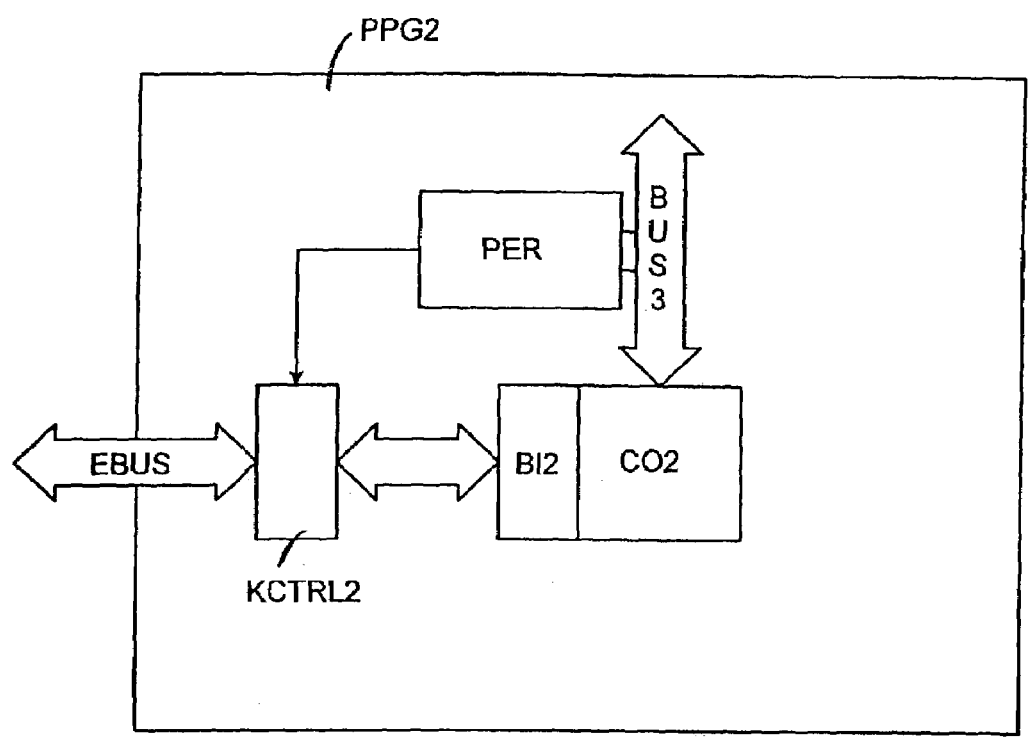
FIG. 3 is a block circuit diagram of a second program-controlled unit for the test unit shown in FIG. 1.

FIG. 3 schematically shows the configuration of an exemplary embodiment of the second program-controlled unit PPG2. For the sake of completeness, it should be pointed out that FIG. 3 shows only the components of the second program-controlled unit that are of particular interest in the present case, i.e. only the components which are significant to the emulation and the cooperation of the program-controlled units PPG1 and PPG2.

The second program-controlled unit PPG2 contains a core CO2, a command injection unit BI2 integrated in the core CO2, an internal bus BUS3 connected to the core CO1, a peripheral unit PER connected to the internal bus BUS1, such as a DMA controller, an analog/digital converter, a digital/analog converter etc., a cooperation control unit KCTRL2 connected to the emulation bus EBUS, to the command injection unit BI2 and to the peripheral unit PER, and further non-illustrated peripheral units and memories.

During emulation, the core CO1 executes a program that is stored either in a non-illustrated program memory or in an overlay memory, the overlay memory used being the memory MEM. That memory from which the program to be executed is read is determined by the program management unit PMU, the program management unit PMU being able to be controlled by the external control device CTRL.

The external control device CTRL also controls the command injection unit BI1, the OCDS module OCDS and the debug control device DEBCTRL.

Execution of the program that is to be executed and/or events arising within or outside of the first program-controlled unit PPG1 can make it necessary for the core CO1 or another component of the first program-controlled unit to access another component that is present in the first program-controlled unit PPG1 or in the second program-controlled unit PPG2. If this is so, the component requiring access requests corresponding access.

The first program-controlled unit PPG1 contains a control device which continually monitors whether a component which is not present in the first program-controlled unit is being accessed, and which, if this is so, then prompts access to the corresponding component of the second program-controlled unit.

In the example under consideration, the control device is the cooperation control unit KCTRL1. If this device establishes that a component of the first program-controlled unit PPG1 is requesting access to a component which is not present in the first program-controlled unit PPG1, for example access to the peripheral unit PER in the second program-controlled unit PPG2, it uses the emulation bus EBUS to prompt corresponding access to this component. To be more precise, in this case the cooperation control unit KCTRL1 outputs appropriate control commands to the second program-controlled unit PPG2 via the EBUS. The cooperation control unit KCTRL2, connected to the EBUS, in the second program-controlled unit PPG2 accepts these control commands and injects them into the core CO2 of the second program-controlled unit PPG2, which then effects the access requested by the first program-controlled unit PPG1. Provided that the access to the component which is not present in the first program-controlled unit PPG1 includes reading of data from this component, these data are read by the core CO2 and are output to the first program-controlled unit PPG1 by the cooperation control unit KCTRL2 via the emulation bus EBUS. The cooperation control unit KCTRL1 in the first program-controlled unit PPG1 accepts these data and forwards them via the emulation bus interface to the component requesting access.

The emulation bus EBUS can also be used for forwarding interrupt requests coming from a component contained in the second program-controlled unit PPG2, for example an interrupt request coming from the peripheral unit PER, to the first program-controlled unit PPG1, where they can be processed.

To establish whether access to a component that is not present in the first program-controlled unit PPG1 is being requested, trace data that are output from the trace interface TIF are taken into account. The trace data are data and signals representing internal states and operations in the first program-controlled unit PPG1 and are output by the trace interface TIF at very short intervals of time. The trace data also contain data which can be used to establish whether and possibly which component of the first program-controlled unit PPG1 wishes to access another component, and which component this other component is. The cooperation control unit KCTRL1 can thus ascertain beyond doubt from the trace data whether access to a component that is not present in the first program-controlled unit is currently being requested.

It ought to be clear that there are also other ways of establishing whether access to a component that is not present in the first program-controlled unit is being requested. By way of example, provision could be made to ascertain whether access to a component that is not present in the first program-controlled unit is being requested by evaluating the data transmitted via a line or a bus that is used to transmit the data or signals requesting the access operations that are to be ascertained.

The aforementioned trace data are also supplied to the debug control device DEBCTRL. The debug control device extracts particular data from the trace data that are supplied to it, compresses them and writes them to the memory MEM, which is also used as a trace memory. Which data are to be extracted from the trace data and under which conditions the extracted trace data are to be written to the memory MEM are prescribed for the debug control device DEBCTRL by the external control device CTRL.

The memory MEM is a memory having a storage capacity of at least 64 kbits. Therefore, a memory having a storage capacity of at least 64 kbits is available for storing trace data.

The trace data written to the memory MEM are output via the interface CTRLIF, which can be a USB interface, for example, to the external control device CTRL, where they are evaluated.

The configuration described allows the states existing and operations taking place in a program-controlled unit to be tracked and altered with minimal complexity. In particular, there is no longer any need for the program-controlled unit used in normal operation of the target system to have available an emulation version which corresponds to it exactly; it is also possible to use a program-controlled unit emulation version which corresponds only partially to the program-controlled unit used in normal operation of the target system.

I claim:

1. A configuration for in-circuit emulation of a program-controlled unit having components, the configuration comprising:
a test unit for replacing, during emulation, the program-controlled unit used in normal operation of a system containing the program-controlled unit, said test unit having a first program-controlled unit and a second program-controlled unit connected to said first program-controlled unit, said first program-controlled unit containing first components emulating only some of the components of the program-controlled unit replaced by said test unit, said second program-controlled unit containing second components emulating others of the components of the program-controlled unit replaced by said test unit not emulated by said first program-controlled unit, and during emulation said first program-controlled unit executing a program normally executed by the program-controlled unit during normal operation of the system, said first program-controlled unit containing a control device for monitoring whether one of said first components of said first program-controlled unit requests access to a component not contained in said first program-controlled unit and, if the access is requested, said first program-controlled unit prompting appropriate access to an appropriate one of said second components in said second program-controlled unit.

2. The configuration according to claim 1, wherein said control device ascertains whether the access to the component not contained in said first program-controlled unit is requested by evaluating trace data generated in said first program-controlled unit.

3. The configuration according to claim 1, wherein said control device ascertains whether the access to the component not contained in said first program-controlled unit is requested by evaluating data transmitted via a line or a bus used to transmit the data or signals requesting access operations which are to be ascertained.

4. The configuration according to claim 1, wherein:
said second program-controlled unit has a core; and
said control device of said first program-controlled unit prompts access operations to said second components in said second program-controlled unit by transmitting to said second program-controlled unit commands to be executed by said core of said second program-controlled unit.

5. The configuration according to claim 4, wherein said second program-controlled unit injects the commands supplied to said second program-controlled unit by said first program-controlled unit into said core and executes them there.

6. The configuration according to claim 1, wherein said second program-controlled unit contains a control device for forwarding to said first program-controlled unit data output by said second components of said second program-controlled unit which are not present in said first program-controlled unit.

7. The configuration according to claim 1, wherein said second program-controlled unit contains a control device for forwarding to said first program-controlled unit interrupt requests output by said second components of said second program-controlled unit not present in said first program-controlled unit.

8. The configuration according to claim 1, wherein the system has connections for connecting the program-controlled unit replaced by said test unit to the system containing the program-controlled unit, the connections having a first portion connected to said first program-controlled unit and a second portion connected to said second program-controlled unit during emulation.

9. The configuration according to claim 1, wherein said second program-controlled unit used is the program-controlled unit replaced by the test unit during emulation.

10. The configuration according to claim 1, further comprising a bus connecting said first program-controlled unit to said second program-controlled unit, said first program-controlled unit having connections connecting said first program-controlled unit to said bus and output data only during emulation.

11. The configuration according to claim 1, wherein said first program-controlled unit contains a memory for storing trace data, and said memory has a storage capacity of at least 64 kbits.

* * * * *